(12) United States Patent
Shirataki et al.

(10) Patent No.: US 8,485,332 B2
(45) Date of Patent: Jul. 16, 2013

(54) ROLLER-TYPE ONE-WAY CLUTCH

(75) Inventors: Hirobumi Shirataki, Fukuroi (JP);
Shinya Okuma, Fukuroi (JP);
Tomoharu Ando, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 290 days.

(21) Appl. No.: 12/680,376

(22) PCT Filed: Mar. 25, 2008

(86) PCT No.: PCT/JP2008/056264
§ 371 (c)(1),
(2), (4) Date: Mar. 26, 2010

(87) PCT Pub. No.: WO2009/107251
PCT Pub. Date: Sep. 3, 2009

(65) Prior Publication Data
US 2010/0213021 A1    Aug. 26, 2010

(30) Foreign Application Priority Data

Feb. 27, 2008  (JP) ................................. 2008-045919

(51) Int. Cl.
*F16D 41/067* (2006.01)
(52) U.S. Cl.
USPC ............. 192/45.016; 192/45.008; 192/45.019
(58) Field of Classification Search
USPC ............. 192/45.016, 45.001, 45.006, 45.008, 192/45.019
See application file for complete search history.

(56) References Cited

U.S. PATENT DOCUMENTS

| 1,708,215 | A |   | 4/1929  | Chryst |
|-----------|---|---|---------|--------|
| 2,843,238 | A |   | 7/1958  | Rozner |
| 2,902,125 | A | * | 9/1959  | House et al. ............. 192/45.019 |
| 3,011,606 | A |   | 12/1961 | Ferris et al. |
| 3,166,169 | A | * | 1/1965  | Wade et al. ............. 192/45.014 |
| 3,190,417 | A |   | 6/1965  | Bacon |

(Continued)

FOREIGN PATENT DOCUMENTS

CN    1592667 A    3/2005
DE    29 28 587 A1    1/1981

(Continued)

OTHER PUBLICATIONS

Office Action dated May 14, 2012, in Chinese Application No. CN 200880127624.2 (with English Translation).

(Continued)

*Primary Examiner* — Richard M. Lorence
(74) *Attorney, Agent, or Firm* — Miles & Stockbridge P.C.

(57) ABSTRACT

The present invention provides a roller type one-way clutch comprising an outer race in which pockets provided at their inner surfaces with cam surfaces are formed, an inner race spaced apart from the outer race in a radial inner diameter side and disposed coaxially with the outer race for a relative rotational movement and having an annular outer peripheral track surface, a plurality of rollers disposed within the pockets to be engaged with the cam surfaces and adapted to transmit torque between the outer race and the inner race, a holder having a cylindrical portion and windows provided in the cylindrical portion to hold the plurality of rollers, and springs disposed within the pockets between the outer race and the inner race and adapted to bias the rollers to be engaged with the cam surfaces, and wherein the holder is rotatable relative to the outer race and biasing forces of the springs are transmitted to the holder via the rollers.

5 Claims, 6 Drawing Sheets

U.S. PATENT DOCUMENTS

| | | | |
|---|---|---|---|
| 3,547,238 A | 12/1970 | Harmon | |
| 3,656,591 A | 4/1972 | Marland et al. | |
| 3,718,212 A * | 2/1973 | Havranek | 192/45.01 |
| 4,368,809 A | 1/1983 | Husmann | |
| 4,724,940 A | 2/1988 | Lederman | |
| 4,932,508 A | 6/1990 | Lederman | |
| 4,986,402 A | 1/1991 | Neuwirth et al. | |
| 4,995,490 A * | 2/1991 | Kanai | 192/45.006 |
| 5,074,393 A | 12/1991 | Itomi | |
| 5,271,486 A | 12/1993 | Okamoto et al. | |
| 5,279,400 A | 1/1994 | Riggle et al. | |
| 5,328,010 A | 7/1994 | Lederman | |
| 5,343,991 A | 9/1994 | Premiski et al. | |
| 5,647,800 A | 7/1997 | Warnke et al. | |
| 5,704,458 A | 1/1998 | Neuwirth et al. | |
| 5,842,548 A | 12/1998 | Sato et al. | |
| 5,941,355 A | 8/1999 | Iga | |
| 6,003,799 A | 12/1999 | Jung | |
| 6,374,974 B1 * | 4/2002 | Wake | 192/45.016 |
| 6,796,413 B2 | 9/2004 | Fukui et al. | |
| 6,848,552 B2 | 2/2005 | Miller | |
| D586,832 S | 2/2009 | Shirataki et al. | |
| 7,740,118 B2 | 6/2010 | Shirataki et al. | |
| 8,002,096 B2 * | 8/2011 | Shirataki et al. | 192/45.016 |
| 8,037,986 B2 | 10/2011 | Takasu | |
| 8,042,671 B2 * | 10/2011 | Kinoshita | 192/45.019 |
| 8,162,114 B2 * | 4/2012 | Shirataki et al. | 192/45.017 |
| 2003/0085092 A1 | 5/2003 | Fukui et al. | |
| 2004/0139743 A1 | 7/2004 | Sato | |
| 2005/0034951 A1 | 2/2005 | Takasu | |
| 2007/0246318 A1 | 10/2007 | Shirataki et al. | |
| 2007/0251794 A1 | 11/2007 | Shirataki et al. | |
| 2008/0196995 A1 | 8/2008 | Mikami et al. | |
| 2009/0242346 A1 | 10/2009 | Kinoshita | |
| 2009/0277739 A1 | 11/2009 | Takasu | |
| 2009/0301257 A1 * | 12/2009 | Shirataki et al. | 74/7 C |
| 2010/0084239 A1 * | 4/2010 | Ando | 192/45 |
| 2010/0096235 A1 * | 4/2010 | Shirataki et al. | 192/45 |
| 2010/0096236 A1 * | 4/2010 | Ando | 192/45 |
| 2010/0101910 A1 * | 4/2010 | Ando | 192/45 |
| 2010/0108455 A1 * | 5/2010 | Shirataki et al. | 192/45 |
| 2010/0116611 A1 | 5/2010 | Shirataki et al. | |
| 2010/0258398 A1 | 10/2010 | Shirataki et al. | |
| 2010/0314211 A1 * | 12/2010 | Shirataki et al. | 192/45 |

FOREIGN PATENT DOCUMENTS

| | | |
|---|---|---|
| EP | 0 237 243 A1 | 9/1987 |
| JP | 05-044615 A | 2/1993 |
| JP | 08-061192 A | 3/1996 |
| JP | 10-009292 A | 1/1998 |
| JP | 2003-148518 A | 5/2003 |
| JP | 2003-172377 A | 6/2003 |
| JP | 2004-346951 A | 12/2004 |
| JP | 2005-172181 A | 6/2005 |
| JP | 2006-275219 A | 10/2006 |
| JP | 2007-064475 A | 3/2007 |
| JP | 2007-278426 A | 10/2007 |
| JP | 2008-138712 A | 6/2008 |
| JP | 2008/138723 A | 6/2008 |
| TW | 354820 | 3/1999 |
| TW | 1264503 B | 10/2006 |
| TW | 200801364 A | 1/2008 |
| WO | WO 03/047809 A1 | 6/2003 |
| WO | WO 2008/047457 A1 | 4/2008 |

OTHER PUBLICATIONS

Office Action issued May 10, 2012, in U.S. Appl. No. 12/680,376.

Office Action issued Aug. 6, 2010 in Taiwan Patent Application No. 097110807.

Office Action issued May 21, 2012 in Japanese Patent Application No. 2008-279407.

Office Action issued Apr. 16, 2012 in Japanese Patent Application No. 2008-148984.

Office Action issued May 21, 2012 in Japanese Patent Application No. 2008-258675.

Office Action issued May 21, 2012 in Japanese Patent Application No. 2008-267227.

Office Action issued Nov. 7, 2012 in European Patent Application No. 12186685.9.

* cited by examiner

ROLLER-TYPE ONE-WAY CLUTCH

TECHNICAL FIELD

The present invention relates to a roller type one-way clutch used as a part such as a torque transmitting member or a back stopper in a driving apparatus of an automobile, an industrial machine or the like, for example.

BACKGROUND ART

In general, a roller type one-way clutch is constituted by an outer race, an inner race disposed coaxially with the outer race, a plurality of rollers disposed between an outer peripheral surface of the inner race and an inner periphery cam surface of the outer race and adapted to transmit torque, and springs contacted with the rollers at an idle rotation side.

With this arrangement, in the one-way clutch, the inner race is rotated only in one direction with respect to the outer race by a cam mechanism constituted by the roller and the cam surface. That is to say, the inner race is designed so that the inner race is idly rotated with respect to the outer race in one direction and serves to transmit rotational torque to the outer race via the cam mechanism only in the opposite direction.

In general, in the roller type one-way clutch, in order to obtain positive engagement, each of the rollers as torque transmitting members is biased by the associated spring to be engaged with the cam surface. In order to engage the rollers with the cam surfaces positively, it is important that the plurality of rollers be operated in synchronous with each other.

Particularly, in a roller type one-way clutch for a motor bike, since the number of rollers is small (for example, three or six), if all of the rollers are not engaged with the corresponding cam surfaces positively, a design torque capacity may not be obtained.

Japanese Patent Application Laid-open No. 2003-172377 discloses a technique in which holder portions are provided in pockets to prevent the rollers and the springs from dislodging toward the inner peripheral side of the inner race. However, this document does not teach an arrangement for synchronizing the plurality of rollers positively.

If a function of the spring for biasing the roller is worsened or stopped partially or entirely, the rollers cannot be synchronized with each other thereby to lose the reliability of the engagement, which affects a bad influence upon the stability of the operation of the roller type one-way clutch.

DISCLOSURE OF THE INVENTION

Accordingly, an object of the present invention is to provide a roller type one-way clutch in which rollers are synchronized positively to achieve high reliable engagement.

To achieve the above object, the present invention provides a roller type one-way clutch comprising an outer race in which pockets provided at their inner surfaces with cam surfaces are formed, an inner race spaced apart from the outer race in a radial inner diameter side and disposed coaxially with the outer race for a relative rotational movement and having an annular outer peripheral track surface, a plurality of rollers disposed within the pockets to be engaged with the cam surfaces and adapted to transmit torque between the outer race and the inner race, a holder having a cylindrical portion and windows provided in the cylindrical portion to hold the plurality of rollers, and springs disposed within the pockets between the outer race and the inner race and adapted to bias the rollers to be engaged with the cam surfaces, and wherein the holder is rotatable relative to the outer race and biasing forces of the springs are transmitted to the holder via the rollers.

Preferably, the holder of the roller type one-way clutch of the present invention serves to synchronize operations of the plurality of rollers.

Further, the spring of the roller type one-way clutch of the present invention may be an accordion spring.

Further, in the roller type one-way clutch of the present invention, the cylindrical portion of the holder may is provided at its axial one end with a flange portion extending radially outwardly.

Further, the inner peripheral surface of the outer race may be provided at its axial edge with an annular stepped portion with which the flange portion of the holder is engaged.

According to the roller type one-way clutch of the present invention, the following effects can be obtained.

Since the holder can be rotated relative to the outer race and the biasing forces of the springs are transmitted to the holder via the rollers, rotational forces directing toward an urging direction are applied to the holder from the respective rollers, with the result that the operations of the rollers can be synchronized by the holder.

In use, if one or some of the springs are malfunctioned, since the biasing forces are transmitted to the holder via the rollers by the remaining springs and the urging forces are applied to the rollers from the holder, a roller type one-way clutch having higher reliability can be obtained.

Due to the urging of the respective springs and the synchronization of the holder, the reliability of the engagement can be more enhanced. Further, if the one-way clutch is assembled to the inner race, since the rollers can easily be shifted to the idle rotation side by the synchronizing action of the holder, an assembling ability is enhanced.

Further, due to the excellent synchronization of the rollers, the noise generated by the roller type one-way clutch can be reduced.

Further, since the flange portion provided on the cylindrical portion is engaged by the stepped portion provided on the outer race, the holder is prevented from being dislodged in the axial direction, with the result that Further features of the present invention will become apparent from the following description of exemplary embodiments with reference to the attached drawings.

BEST MODE FOR CARRYING OUT THE INVENTION

Now, embodiments of the present invention will be fully explained with reference to the accompanying drawings. Incidentally, it should be noted that the embodiments described hereinafter are merely examples of the present invention and various alterations can be made within the present invention.

(First Embodiment)

Figure 1:
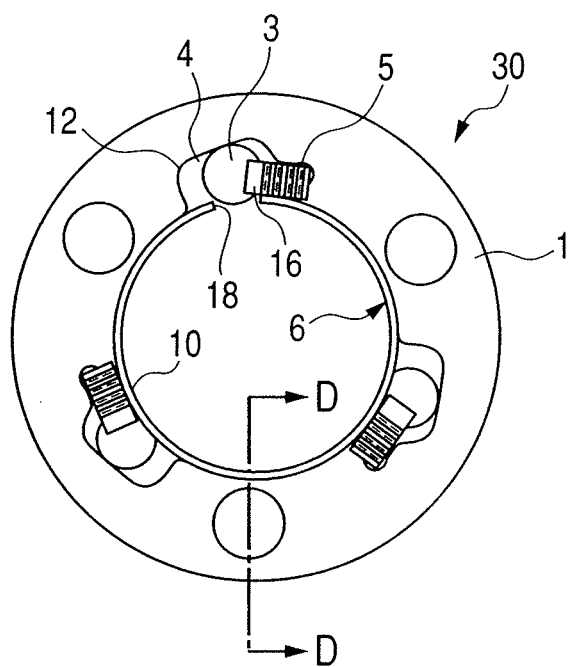
FIG. 1 is a front view of a roller type one-way clutch according to a first embodiment of the present invention, showing a condition before the clutch is engaged.
Figure 2:
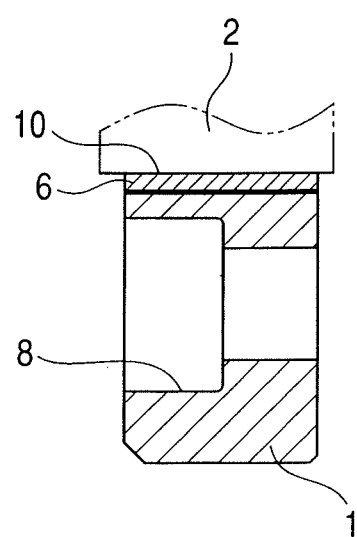
FIG. 2 is a partial sectional view taken along the line D-D in FIG. 1.

FIG. 1 is a front view of a roller type one-way clutch according to a first embodiment of the present invention and FIG. 2 is a partial sectional view taken along the line D-D in FIG. 1.

FIGS. 1 and 2 show a condition before rollers are engaged, i.e. an unlocked or idle rotation condition of the one-way clutch. In the illustrated embodiment, an inner race 2 (shown by the imaginary line in FIG. 2) is idly rotated.

As shown in FIG. 1, a roller type one-way clutch 30 comprises an annular outer race 1 provided at its inner periphery with pockets 4 formed as recessed portions having cam surfaces 12, an inner race 2 (shown by the imaginary line in FIG. 2) spaced apart from the outer race 1 radially inwardly and coaxially disposed with the outer race for a relative rotational movement and having an annular outer peripheral track surface 11, a plurality of rollers 3 disposed within the corresponding pockets 4 and adapted to transmit torque between the outer peripheral track surface 11 of the inner race 2 and the cam surfaces 12, and a holder 6 for holding the plurality of rollers 3. The holder 6 is not secured to either the outer race 1 or the inner race 2 so that it can be freely rotated relative to the outer race 1 and the inner race 2.

In the illustrated embodiment, three pockets 4 are provided in the outer race 1 equidistantly along a circumferential direction. Further, three stepped bolt holes 8 used for securing the outer race to an output/input member (not shown) and extending through in an axial direction are also provided in the outer race equidistantly along the circumferential direction. As shown in FIG. 1, the pockets 4 and the bolt holes 8 are arranged alternately and equidistantly. Further, it should be noted that the number of the pockets 4 can be selected, for example, between three and six in accordance with the magnitude of the torque.

As shown in FIGS. 1 and 2, the holder 6 for holding the rollers 3 has a cylindrical portion 10 and windows 18 provided in the cylindrical portion 10 and adapted to hold the plurality of rollers therein. The number of the windows 18 corresponds to the number of the rollers 3 and each window extends through the holder in the radial direction and holds the corresponding one roller 3

As shown in FIG. 1, the roller type one-way clutch 30 includes the pockets 4 provided in the outer race 1 and opened at an inner diameter side. A spring 5 for biasing the corresponding roller 3 toward an engagement direction to engage the roller with the corresponding cam surface 12 is disposed within each pocket 4.

As shown in FIG. 2, the cylindrical portion 10 of the holder 6 has a generally cylindrical configuration except for the provision of the windows 18 and no member or element is provided both axial ends of the cylindrical portion. The window 18 extends through the holder in the radial direction and has a rectangular configuration closed in the circumferential and axial directions. Since the roller 3 is engaged by circumferential edges of the window 18, when the roller 3 is shifted in the circumferential direction, the holder is also shifted accordingly.

In the roller type one-way clutch 30 having the above-mentioned arrangement, since the holder 6 is rotatable relative to the outer race 1 and biasing forces of the springs 5 are transmitted to the holder 6 via the rollers 3, rotational forces directing toward an urging direction are applied from the respective rollers 3 to the holder 6, so that the operations of the plural rollers 3 can be synchronized by the holder 6.

Further, during the operation of the roller type one-way clutch 30, if one or some of the springs 5 is malfunctioned, the biasing forces will be transmitted to the holder 6 by the remaining springs 5 via the rollers 3 and the circumferential edges of the windows 18, with the result that, since the forces are applied from the holder 6 to the rollers 3, a roller type one-way clutch having higher reliability can be obtained.

Due to the urging of each spring 5 and the synchronization of the holder 6, higher reliability of the engagement can be achieved. Further, when the roller type one-way clutch 30 is assembled to the inner race 2, since the rollers 3 can easily be shifted toward the idle rotation side by the synchronization of the holder, an assembling ability is enhanced.

(Second Embodiment)

Figure 3:
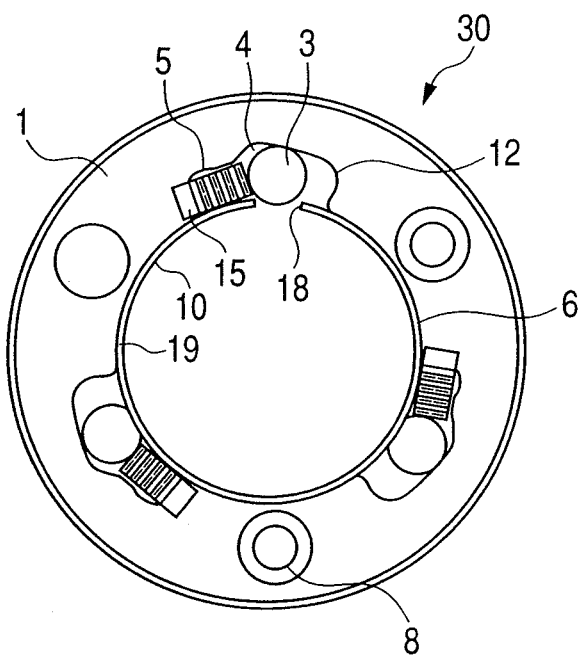
FIG. 3 is a front view of a roller type one-way clutch according to a second embodiment of the present invention, showing a condition before the clutch is engaged.
Figure 4:
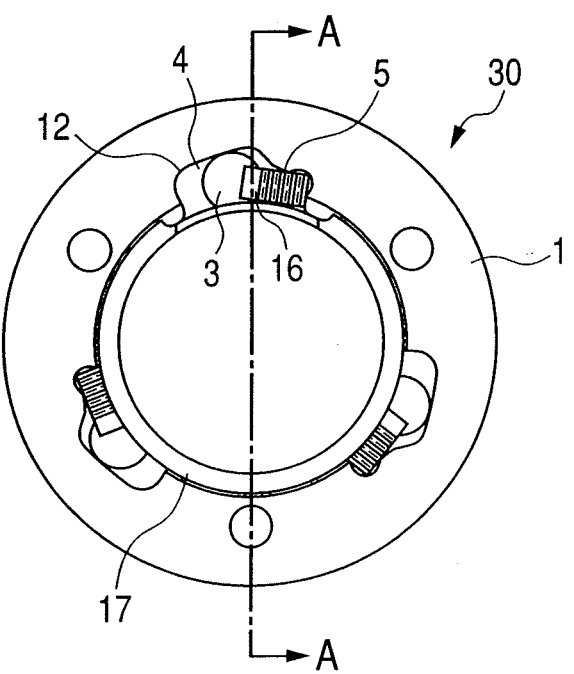
FIG. 4 is front view looked at from a rear side of FIG. 3.

FIG. 3 is a front view of a roller type one-way clutch according to a second embodiment of the present invention, and FIG. 4 is a front view looked at from a rear side of FIG. 3. Further, FIG. 5 is a sectional view taken along the line A-A in FIG. 4.

Figure 5:
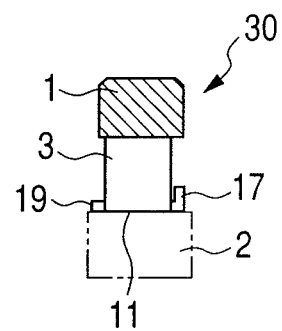
FIG. 5 is a partial sectional view taken along the line A-A in FIG. 4.

FIGS. 3 to 5 show a condition before rollers are engaged, i.e. an unlocked or idle rotation condition of the one-way clutch. In the illustrated embodiment, an inner race 2 is idly rotated. Since a fundamental construction of the second embodiment is substantially the same as that of the first embodiment, only differences will be explained.

One end of the spring i.e. a tab 15 is locked to an axial end face of the outer race 1 as shown in FIG. 3, and the other end of the spring i.e. a tab 16 is pinched between an axial end face of the roller 3 and a flange portion 17 of the holder 6 as shown in FIG. 4. With this arrangement, the spring 5 itself is fixedly supported with respect to the outer race 1 and, at the same time, the roller can be prevented from being dislodged in the axial direction.

Although the spring 5 used in various embodiments of the present invention is an accordion spring, other type of spring such as a coil spring can be used.

The window 18 formed in the cylindrical portion 10 of the holder 6 extends through the holder in the radial direction, and, in the axial direction, the window is closed both at an end near the flange 17 and at an end 19 opposite to the flange 17. That is to say, the roller 3 is seated in the substantially rectangular window 18 and is supported by four edges of the window 18. In order to show a relationship between the window 18 and the roller 3, in FIG. 3 (also in FIG. 6 described hereinafter), the uppermost window 18 with the end 19 omitted.

Since an axial one end of the roller 3 is supported by the tab 16 of the spring 5 and one edge of the window 18 and the other axial end is supported by one edge of the window 18, the roller is prevented from being dislodged in the axial direction. In this case, if a projection and the like are provided on the tab 16 to slightly urge the axial end face of the roller 3, the roller 3 is held in the window 18 more positively. Since the roller 3 is engaged by the circumferential edges of the window 18, when the roller 3 is shifted in the circumferential direction, the holder 6 is also shifted.

As shown in FIGS. 4 and 5, an annular stepped portion 13 is provided at an axial edge of the inner peripheral surface of the outer race 1 and the flange portion 17 of the holder 6 is engaged by the stepped portion 13. An axial depth of the stepped portion 13 is slightly greater than a thickness of the flange portion 17, so that, when the flange portion 17 is engaged by the stepped portion 13, the axial end face of the outer race 1 becomes flush with the axial end face of the flange portion 17. Further, an outer diameter of the stepped portion 13 is slightly greater than an outer diameter of the flange portion 17 of the holder 6, so that the flange portion 17 is engaged by the stepped portion 13 with predetermined clearance.

Thus, since it is not needed to reduce an axial length of the outer race 1 by an amount corresponding to the thickness of the flange portion 17, the axial length of the outer race 1 can be maintained adequately, a margin of engagement between the cam surface 12 and the roller 3 is left. Further, the axial length can be reduced without changing the rigidity of the cam surface 12 of the outer race 1.

Also in the second embodiment, the holder 6 is rotatable relative to the outer race 1and the biasing forces of the springs 5 are transmitted to the holder 6 via the rollers 3 and the circumferential edges of the windows 18. Thus, the operations of the plural rollers can be synchronized.

Further, during the operation of the roller type one-way clutch, if one or some of the springs 5 is malfunctioned, the biasing forces will be transmitted to the holder 6 by the remaining springs 5 via the rollers 3 and the circumferential edges of the windows 18, with the result that, since the forces are applied from the holder 6 to the rollers 3, a roller type one-way clutch having higher reliability can be obtained.

Due to the urging of each spring 5 and the synchronization of the holder 6, higher reliability of the engagement can be achieved. Further, when the roller type one-way clutch 30 is assembled to the inner race 2, since the rollers 3 can easily be shifted toward the idle rotation side by the synchronization of the holder, an assembling ability is enhanced.

Figure 6:
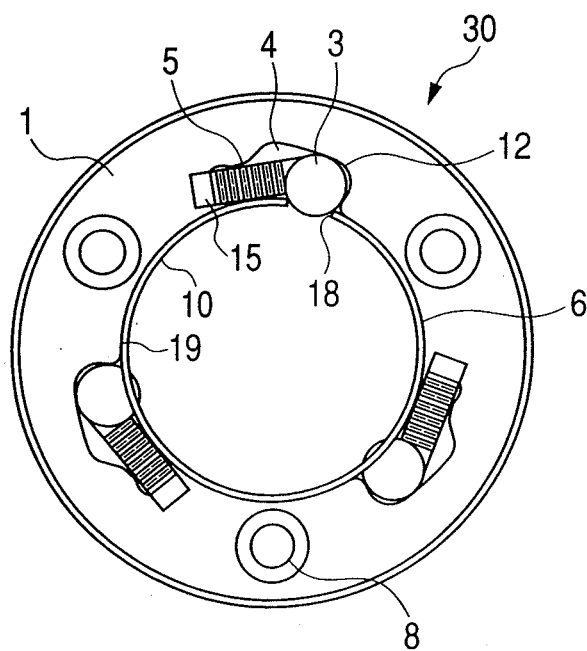
FIG. 6 is a front view of the roller type one-way clutch according to the first or second embodiment of the present invention, showing a condition that the clutch is engaged.
Figure 7:
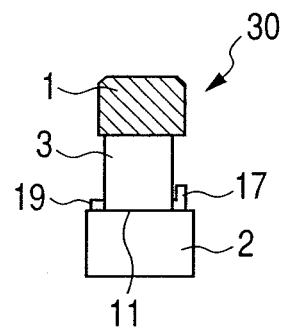
FIG. 7 is an axial sectional view taken along the line B-B in FIG. 8.
Figure 8:
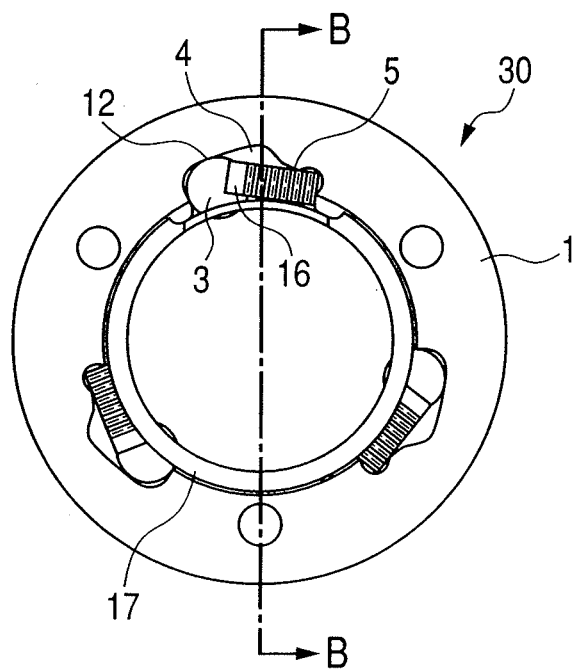
FIG. 8 is a front view looked at from a rear side of FIG. 6.

FIGS. 6 to 8 show a condition that the rollers are engaged with the cam surfaces, i.e. a locked condition that the one-way clutch is engaged under a high load. FIG. 6 is a front view of the roller type one-way clutch according to the first or second embodiment of the present invention, showing a condition that the clutch is engaged. FIG. 7 is an axial sectional view taken along the line B-B in FIG. 8. Further, FIG. 8 is a front view looked at from a rear side of FIG. 6.

From the idle condition shown in FIGS. 1 to 5, when a load is applied so at to operate the clutch, the rollers 3 biased by the springs 5 are engaged by the cam surfaces 12 of the pockets 4. In this case, as the rollers 3 are displaced in the circumferential direction, the holder 3 is also shifted together with the rollers 3. Thus, the windows 18 are also shifted together with the rollers 3.

In this case, since the axial one end of each roller 3 is supported by the tab 16 of the spring 5 and the other axial end is supported by the window 18, the roller is prevented from being dislodged in the axial direction, thereby providing the stable operation of the roller.

Each roller 3 is engaged by the corresponding cam surface 12 and, at the same time, a peripheral surface of the roller slightly protruded inwardly from the window 18 is engaged by the outer peripheral surface of the inner race 2. Accordingly, the relative rotation between the outer race 1 and the inner race 2 is locked via the rollers 3.

As mentioned above, since the holder 6 has no rotation presenting means to be rotated freely, the holder 6 can be moved by the rollers 3 themselves, so that each roller 3 can be shifted by a distance greater than the width of the window 18 of the holder 6.

Figure 9:
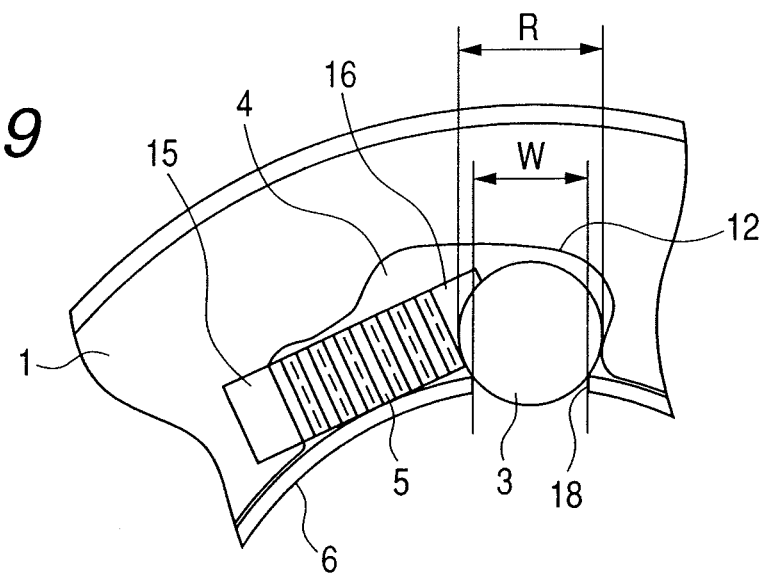
FIG. 9 is a partial front view of the roller type one-way clutch before an inner race is mounted.

FIG. 9 is a partial front view of the roller type one-way clutch before the inner race is mounted. Although each roller is biased by the corresponding spring 5 to be urged against the cam surface 12, the roller is seated in the window 18 of the holder 6 by its own weight.

As shown in FIG. 9, since a circumferential width W of the window 18 of the holder 6 is smaller than a diameter R of the roller 3, the roller 3 can be seated on the window 18. As mentioned above, since the holder 6 is not secured to the outer race 1 and the inner race 2, the holder can be rotated; however, since the roller 3 is fitted in the window 18, when the roller 3 is displaced within the pocket 4, the holder 6 is rotated accordingly.

Figure 10:
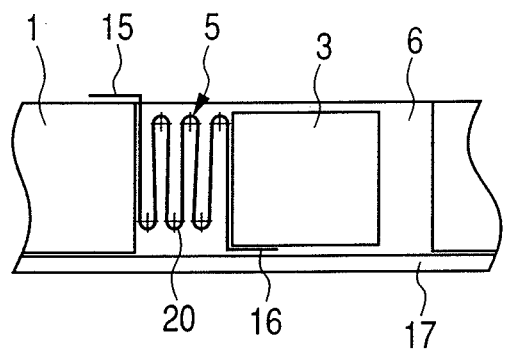
FIG. 10 is a partial side view looked at from an inner diameter side of FIG. 7.

FIG. 10 is a partial side view looked at from an inner diameter side of FIG. 9. The spring 5 has a tab 15 bent at a substantially right angle from a bellows type body portion 20 and the tab 15 is engaged by an axial one end face of the outer race 1. Further, at an end of the spring opposite to the tab 15, the spring has a tab 16 bent at a substantially right angle from the body portion 20 and the tab 16 is engaged by the axial one end face of the roller 3.

The tab 16 engaged by the roller 3 is pinched between the axial end face of the roller 3 and the flange portion 17 of the holder 6. Accordingly, the tab 16 can hold the roller 3 in the axial direction. In this way, since the spring 5 is held in the fixed condition, the spring is not expanded within the pocket 4, thereby preventing the wear of the spring 5.

Figure 11:
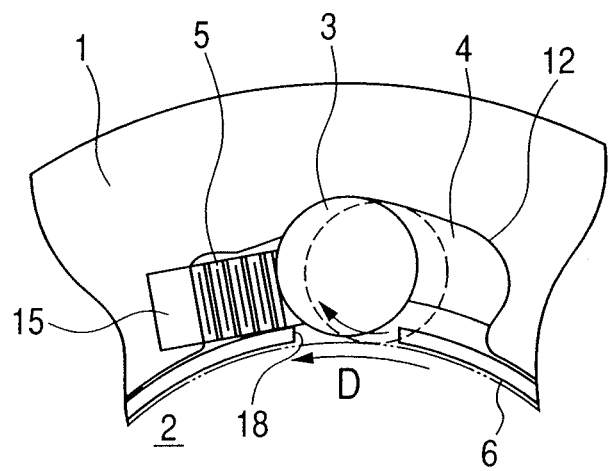
FIG. 11 is a partial front view for explaining an operation of the roller type one-way clutch, in a condition that the inner race is idly rotated.
Figure 12:
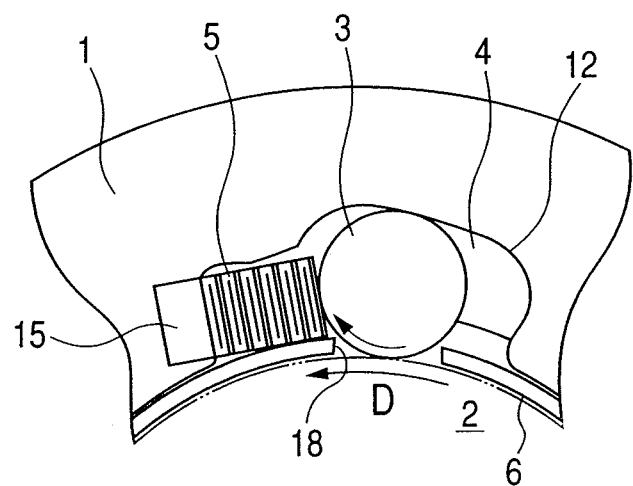
FIG. 12 is a partial front view for explaining the operation of the roller type one-way clutch, in a condition that the inner race is transited from the idle rotation from a reverse rotation.
Figure 13:
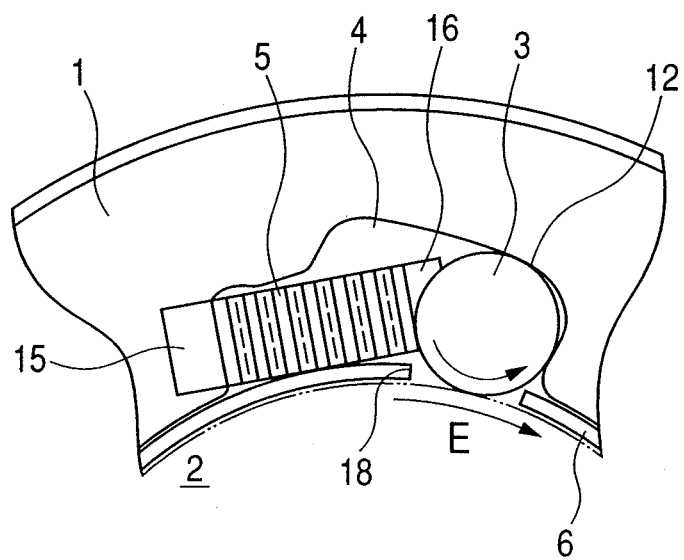
FIG. 13 is a partial front view for explaining an operation of the roller type one-way clutch, in a condition that the inner race is reversely rotated.

FIGS. 11 to 13 are partial front views for explaining the roller type one-way clutch. Particularly, FIG. 11 shows a condition that the inner race is rotated idly, and FIG. 12 shows a condition that the inner race is being transitioned from the idle rotation to a reverse rotation, and FIG. 13 shows a condition that the inner race is rotated reversely.

In FIG. 11, the inner race 2 is rotated in a direction shown by the arrow D (idle rotation). In this case, by the rotation of the inner race 2, the roller is shifted, together with the window 18 of the holder 6, toward the spring 5 within the pocket 4. That is to say, since the roller is shifted the rotational direction of the inner race 2 together with the holder 6, the roller 3 is displaced to the left in FIG. 11 in opposition to the biasing force of the spring 5 while being rotated in a direction shown by the arrow as shown.

FIG. 12 shows a condition that, before the inner race 2 is rotated reversely, the speed of the rotation (idle rotation) of the inner race in the direction D is decreased, so that a force for displacing the roller 3 to the left is reduced. In this condition, although the roller 3 is displaced toward the cam surface 12 by the biasing force of the spring 5, the roller is not yet engaged with the cam surface 12.

When the inner race 2 begins to rotate in an opposite direction of FIGS. 11 and 12 (direction shown by the arrow E in FIG. 13), the load on the roller 3 is removed, with the result that the roller 3 is displaced to a position where it is engaged with the cam surface 12, by the biasing force of the spring 5 and the displacement of the window 18 of the holder 6 shifted due to the reverse rotation of the inner race 2. This condition is shown in FIG. 13. In this case, since the roller 3 is shifted together with the holder 6 by the rotation of the inner race 2 to be rotated in the direction as shown, the roller is engaged with the cam surface 12 positively.

In the high load condition for the engagement shown in FIG. 13, the rotation of the inner race 2 is transmitted to the outer race 1 by the engagement between the roller 3 and the cam surface 12. That is to say, the inner race 2 and the outer race 1 are integrally rotated in the direction shown by the arrow.

The relationship between the window and the diameter of the roller and the operation of the roller type one-way clutch with respect to FIGS. 9 to 13 are commonly applied to the first and second embodiments.

Further, since the circumferential width of the window of the holder is smaller than the diameter of the roller, the roller can be prevented from being dislodged in the radial direction during the transportation of the clutch.

Further, due to the fact that the holder is rotatable relative to the outer race, since the holder is shifted together with the roller as the roller is shifted, the holder is prevented from being dislodged in the circumferential direction.

Due to the fact that the outer race is provided at its inner peripheral axial edge with the annular stepped portion to which the flange portion of the holder is engaged, since it is not needed to reduce the axial length of the outer race by the amount corresponding to the thickness of the flange portion, the axial length of the outer race can be maintained.

Further, since the roller and the spring can be prevented from being dislodged in the axial and radial directions, all of the rollers can be engaged with the respective cam surfaces positively even under an environmental condition where there exists high vibration, for example, an a motor bike and the like.

INDUSTRIAL AVAILABILITY

Although the present invention can be used as a part such as a torque transmitting member or a back stopper in a driving apparatus of an automobile, an industrial machine or the like, for example, the present invention has excellent effects particularly when it is used in a motor bike.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-045919, filed Feb. 27, 2008, which is hereby incorporated by reference herein in its entirety.

The invention claimed is:

1. A roller type one-way clutch comprising:
   an outer race in which pockets provided at their inner surfaces with cam surfaces are formed;
   an inner race spaced apart from said outer race in a radial inner diameter side and disposed coaxially with said outer race for a relative rotational movement and having an annular outer peripheral track surface;
   a plurality of rollers disposed within said pockets to be engaged with said cam surfaces and adapted to transmit torque between said outer race and said inner race;
   a holder having a cylindrical portion and windows provided in said cylindrical portion to hold said plurality of rollers; and
   springs disposed within said pockets between said outer race and said inner race and adapted to bias said rollers to be engaged with said cam surfaces;
   and wherein
   said holder is rotatable relative to said outer race and biasing forces of said springs are transmitted to said holder via said rollers, said springs being located radially outward of said cylindrical portion of the holder.

2. A roller type one-way clutch according to claim 1, wherein said holder synchronizes operations of said plurality of rollers.

3. A roller type one-way clutch according to claim 1, wherein each spring is an accordion spring.

4. A roller type one-way clutch according to claim 1, wherein said cylindrical portion is provided at its axial one end with a flange portion extending radially outwardly.

5. A roller type one-way clutch according to claim 4, wherein said outer race is provided at its inner peripheral axial edge with an annular stepped portion, and said flange portion of said holder is engaged with said stepped portion.

* * * * *